United States Patent

Stefanutti et al.

[11] Patent Number: 5,083,642
[45] Date of Patent: Jan. 28, 1992

[54] DOUBLE WRAP FRICTION BRAKE BAND AND METHOD OF MANUFACTURE

[75] Inventors: Oscar Stefanutti, Orchard Lake; Omar P. Oszust, Sterling Heights; Richard T. Popchock, Oxford, all of Mich.

[73] Assignee: Advanced Friction Materials Company, Sterling Heights, Mich.

[21] Appl. No.: 471,250

[22] Filed: Jan. 25, 1990

[51] Int. Cl.$^5$ .................... F16D 49/02; B23P 17/00
[52] U.S. Cl. ............................. 188/77 W; 192/80; 29/418
[58] Field of Search ............ 29/416, 418; 188/77 R, 188/77 W, 259; 192/80, 83, 107 T, 109 B; 228/173.6

[56] References Cited

U.S. PATENT DOCUMENTS

| | | | |
|---|---|---|---|
| 2,841,864 | 7/1958 | Kelly | 29/418 |
| 3,386,535 | 4/1968 | Bishop et al. | 188/77 R |
| 4,363,385 | 12/1982 | Schlanger | 192/107 T X |
| 4,581,803 | 4/1986 | Blinks et al. | 29/418 |
| 4,602,706 | 7/1986 | Blinks et al. | 188/259 |
| 4,757,880 | 7/1988 | Grzesiak | 188/77 W |

FOREIGN PATENT DOCUMENTS

| | | | |
|---|---|---|---|
| 1248883 | 1/1989 | Canada | 188/77 W |
| 1248884 | 1/1989 | Canada | 188/77 W |
| 2108014 | 5/1983 | United Kingdom | 188/77 W |

*Primary Examiner*—Robert J. Oberleitner
*Assistant Examiner*—Alfred Muratori
*Attorney, Agent, or Firm*—Brooks & Kushman

[57] ABSTRACT

A double wrap brake band for controlling the clutch drum of an automatic transmission for a vehicle. The band is formed from an integrally stamped strap the ends of which are joined to form the circular band. The strap includes longitudinal slots forming three parallel straps which control the constriction and expansion of the band. A first bracket secured to the outer straps and a second bracket secured to the intermediate strap facilitate control of the constriction/expansion movement. The brackets are secured to the straps such that breakage and malfunction are reduced.

30 Claims, 3 Drawing Sheets

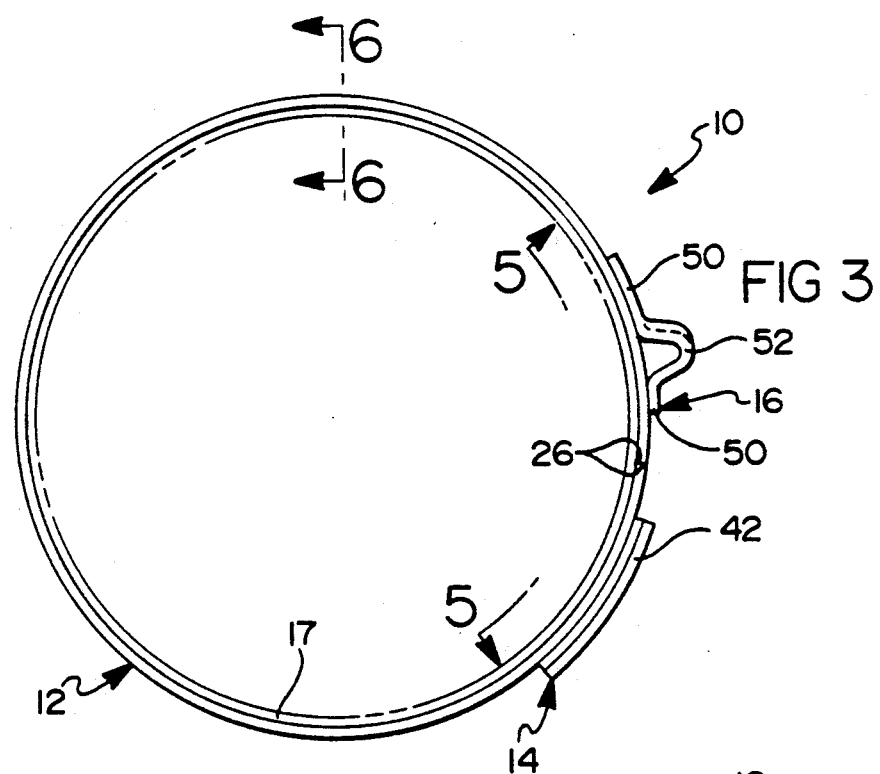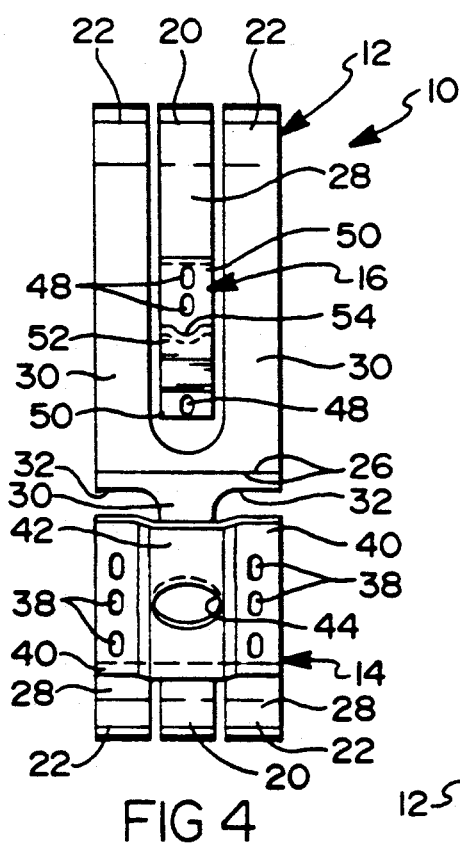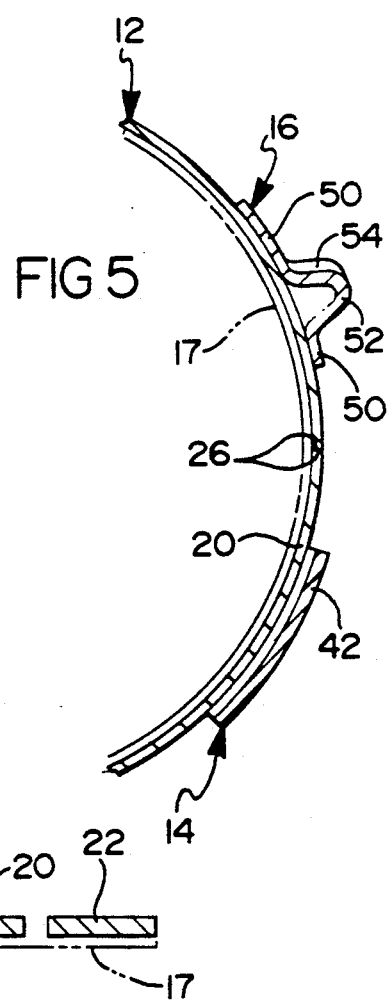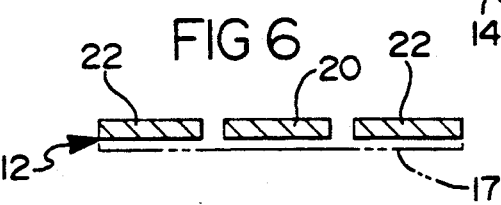

DOUBLE WRAP FRICTION BRAKE BAND AND METHOD OF MANUFACTURE

BACKGROUND OF THE INVENTION

I. Field of the Invention

This invention relates to brake bands for automatic transmissions and, in particular, to an improved double wrap brake band and a method of making such brake bands.

II. Description of the Prior Art

Prior known automatic transmissions for automotive vehicles typically utilize a torque converter drivably connected to a series of clutch drums by a shaft. Conventional brake bands wrap around the clutch drums to effect gear changes which in turn varies the speed or direction of rotation of the drive shaft of the transmission. The brake band is hydraulically controlled to shift the transmission from first gear or to reverse the direction of rotation for the reverse gear. Multi-wrap friction bands thereby retard the rotation of the reaction elements in automatic transmissions to affect the necessary gear changes.

Originally, single wrap brake bands were used in automatic transmissions and in some lower torque load applications the single wrap band is still utilized. Essentially, the single wrap band comprises a single band formed in a circle and control brackets mounted to the ends of the band. The brackets were compressed together to compress the single band around the drum. However, such single wrap brake bands proved inadequate in today's high torque/load transmissions.

Early double wrap brake bands were formed from a thick metal strap having lugs engageable by a hydraulic control unit to compress the band around the clutch drum. The ends of the strap overlap such that the lugs of one end of the strap are received by the opposite end of the strap. The prior known methods of manufacturing such early brake bands creates distortion in the band which can cause an undesirable drag on the clutch drum even in the fully open position.

More recent double wrap brake bands employ a preslotted stamped strap to which is attached a bracket member. The bracket is utilized to compress the band and is welded accordingly to the strap. However, the weld set of the bracket is subject to breakage resulting in failure of the band and a limited life for the transmission. Essentially, the increased componentry and complexity of modern brake bands reduces the operational life of the transmission before repairs are necessary. In order to strengthen the connection between the brackets and band, additional brazing was applied to the bracket and band. However, the brazing process substantially increased the manufacturing costs associated with the prior known brake bands.

SUMMARY OF THE PRESENT INVENTION

The present invention overcomes the disadvantages of the prior known brake bands by providing a simple and cost-effective method of manufacturing a double wrap brake band with increased longevity and reliability.

The present invention generally comprises a band stamped in one-piece and having its ends connected by a butt weld to form a circular brake band adapted to cooperate with the clutch drum. The one-piece band is stamped with longitudinal slots to essentially form three parallel straps which can be constricted to apply friction to the clutch drum. In order to control constriction and expansion of the double wrap brake band a pair of brackets are secured to the independent straps of the band. A first bracket spans the intermediate strap and is fixedly secured to the two outer straps for constrictional movement of the outer straps. A second bracket is secured to the intermediate strap at the end of the band opposite from the first bracket. Both brackets include means for receiving control or anchor structure of the transmission to facilitate selective constriction and expansion of the double wrap brake band. Preferably, a friction lining is secured to the inner surface of the band for improved engagement with the clutch drum.

The method of manufacturing the double wrap brake band includes improved means for securing the brackets to the straps thereby improving the reliability of the band. The straps of the band are provided with a series of apertures to receive corresponding extruded projections formed on the brackets. The projections are tapered to provide a base area greater than the size of the aperture. Accordingly, the bracket is initially pressure fit with the strap apertures and thereafter additional pressure is applied during the welding operation creating a tight frictional fit between the projection and its aperture. The mating engagement of the projections with the apertures provide a stronger connection than the welds alone. As a result, an improved double wrap brake band is formed which is economical to manufacture, lightweight and has increased reliability.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which:

FIG. 3 is a side plan view of the double wrap brake band;

FIG. 4 is an end plan view of the double wrap brake band;

FIG. 5 is a partial cross-sectional view of the brake band taken along lines 5—5 cf FIG. 3;

FIG. 6 is a lateral cross-sectional view of the brake band taken along lines 6—6 of FIG. 3.

DETAILED DESCRIPTION OF A PREFERRED EMBODIMENT OF THE PRESENT INVENTION

Figure 1:
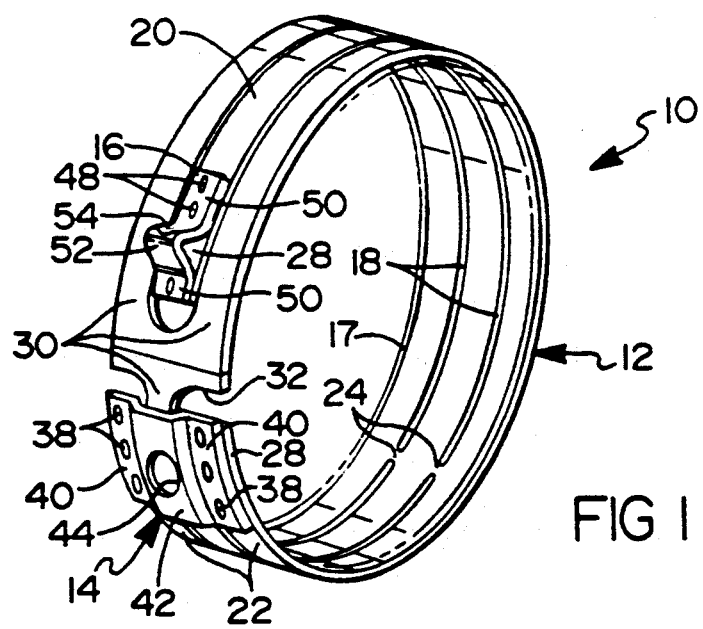
FIG. 1 is an elevated perspective of the completed double wrap brake band embodying the present invention.
Figure 2:
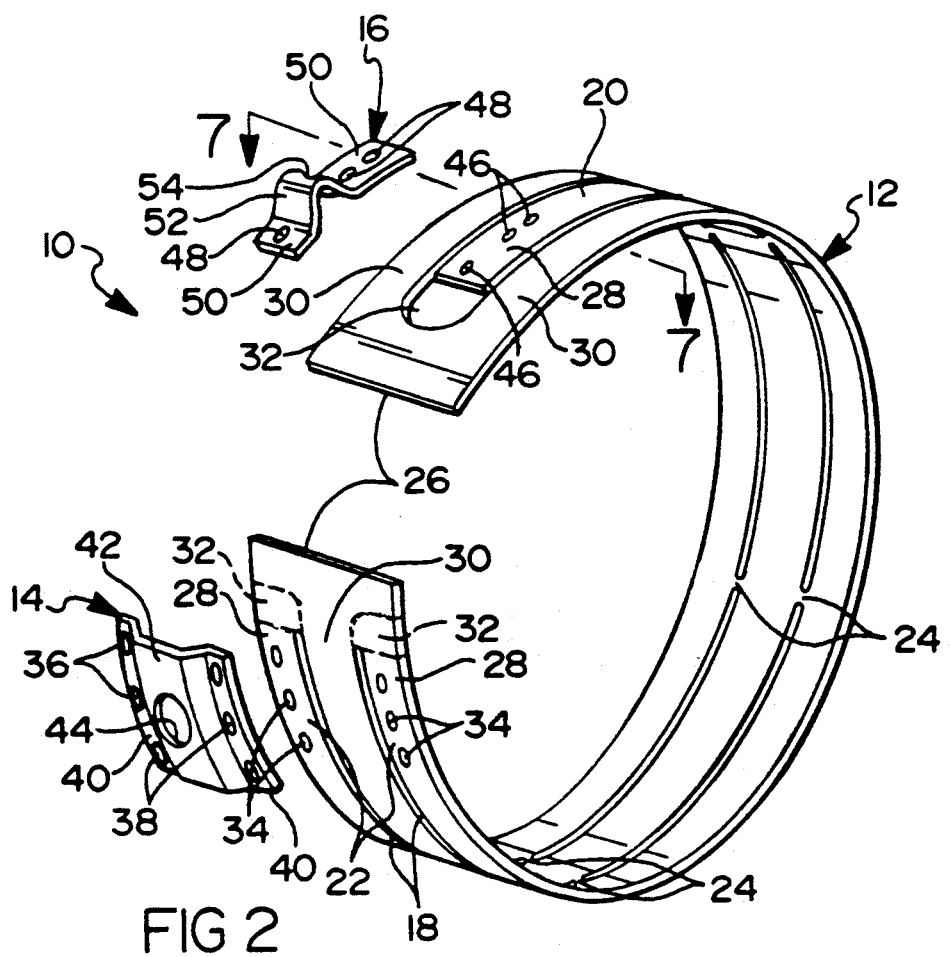
FIG. 2 is an exploded view of the double wrap brake band of the present invention.

Referring first to FIGS. 1 and 2 there is shown an elevated perspective and an exploded view of a double wrap brake band 10 embodying the present invention. The double wrap brake band 10 is designed to control the direction of rotation and gear changes in a clutch drum of an automotive transmission. Suitable hydraulic actuation means of the transmission constrict and expand the brake band 10 for control of clutch drum.

The double wrap brake band 10 comprises an integrally stamped elongated band 12, a first bracket 14 and a second bracket 16 secured to the band 12 as will be subsequently described. A friction lining 17 is applied to the interior surface of the band 12 to facilitate control of the clutch drum. As indicated, the elongated band 12 is stamped of one-piece construction and includes longitudinal slots 18 which form three substantially parallel straps—an intermediate strap 20 and a pair of outer straps 22. The slots 18 may be continuous although in the preferred embodiment cross members 24 connect the intermediate strap 20 at spaced intervals to the outer straps 22. These cross members 24 are removed upon completion of the brake band 10 to allow freedom of movement between the outer straps 22 and the intermediate strap 20. In order to form the circular brake band 10 adapted to fit around the clutch drum of the transmission, the ends 26 of the band 12 are joined, preferably using a butt weld, thereby curving the straps 20 and 22 into a substantially circular form as shown in FIGS. 1 and 3.

Each of the straps includes a first free end 28 which is not connected to any adjoining structure and a second end 30. Once the ends 26 of the band 12 are joined, the second ends 30 of the intermediate strap 20 and the outer straps 22 become joined thereby forming the substantially continuous double wrap configuration of the brake band 10. However, the band 12 is originally stamped with a pair of removable strap segments 32 which temporarily join the first free ends of the outer straps 22 to the second fixed end of the intermediate strap 20. Similarly, the first free end 28 of the intermediate strap 20 is connected to the outer strap 22 by a single cut-out 32. Upon assembly of the brake band 10, these segments 32 are punched out to free the first ends 28 of the outer straps 22 as will be subsequently described herein.

Figure 7A:
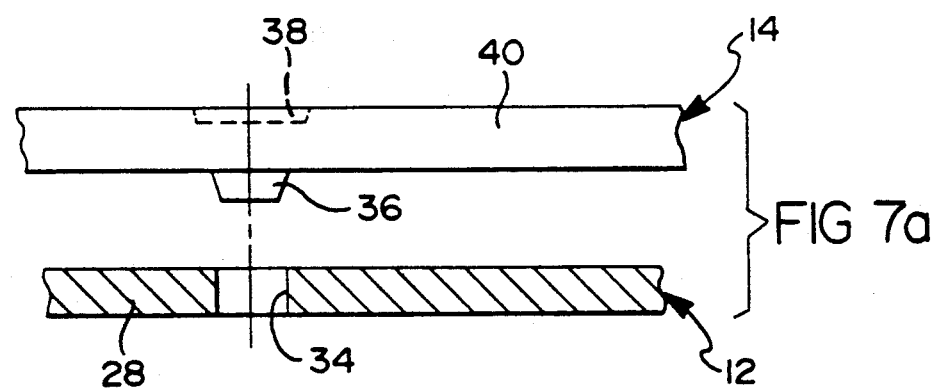
FIG. 7 is a partial cross-sectional view of the assembly of the brackets to the straps of the double wrap brake band of the present invention.
Figure 7B:
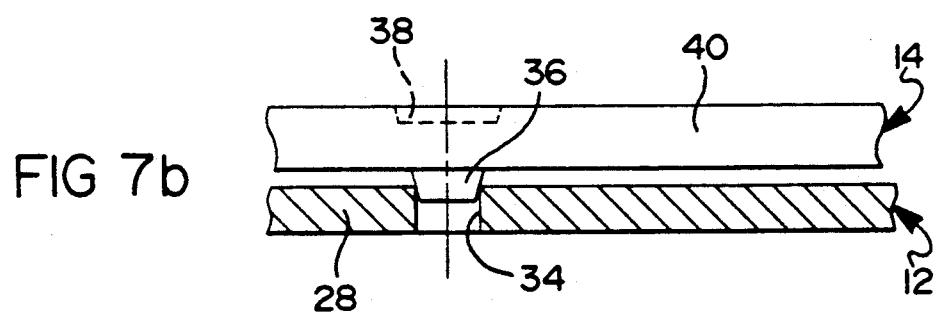
Figure 7C:
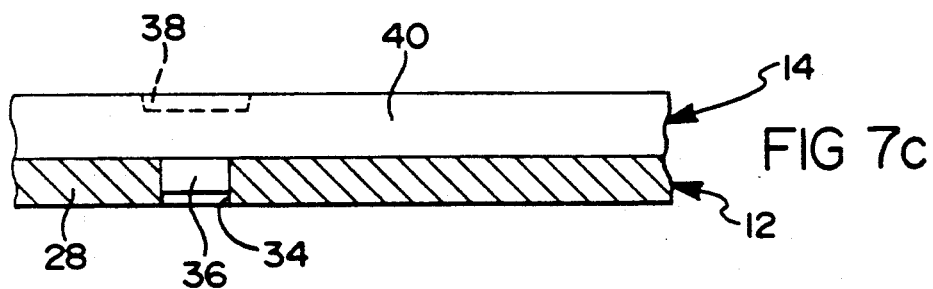

The first bracket 14 and the second bracket 16 are mounted to the corresponding free ends 28 of the straps. The first free end 28 of the outer straps 22 are provided with a series of apertures 34 adapted to receive projections 36 extruded on the underside of the first bracket 14. The extrusion process creates a dimple 38 on the top side of the bracket 14. The projections 36 are provided with a tapered configuration having a base area larger than the area of the corresponding aperture 34. Accordingly, the projections 36 will only fit partially into the aperture 34 as shown in FIG. 7b. However, under compression pressure between the bracket 14 and the strap 22 the projection 36 will deformably squeeze into the aperture 34 creating a friction fit therebetween enhancing the bond between the bracket 14 and straps 22. In an alternative embodiment, the bracket 14 is also welded to the straps 22 for added bonding strength. The first bracket 14 preferably comprises a pair of outer legs 40 in which are formed the projections 36 and a bridge portion 42 connecting the legs 40. The bridge portion 42 of the first bracket 14 is raised such that when the first bracket 14 is mounted to the band 12, the bridge portion 42 will span, in spaced apart relation, the intermediate strap 20. Preferably, a single aperture 44 is formed in the bridge portion 42 of the bracket 14 to receive the hydraulic actuation means of the transmission (not shown) in order to contract and expand the outer straps 22 of the double wrap brake band 10.

Similarly, the second bracket 16 is mounted to the free end 28 of the intermediate strap 20 to provide abutment means to facilitate contraction and expansion of the double wrap brake band 10. The first free end of the intermediate strap 20 includes a series of apertures 46 frictionally receiving extruded projections 48 formed on the underside of the second bracket 16. As with the first bracket 14, the projections 48 are deformably squeezed into the apertures 46 upon application of pressure to join the second bracket 16 to the strap 20. For additional strength, welds between the second bracket 16 and the strap 20 may be added during the compression process. The second bracket 16 preferably comprises a pair of legs 50, which carry the projections 48, and an abutment bridge 52 connecting the legs 50. The abutment bridge 52 preferably is provided with a concave receptacle 54 to receive actuation means of the transmission.

The brackets 14 and 16 may also be joined to the corresponding strap using a plurality of projection welds whereby the apertures 34, 46 are eliminated. As a result, the projections 38, 48 are welded directly to the strap as the brackets 14, 16 are compressed against the band 12.

The double wrap brake band 10 of the present invention is manufactured in three component parts to reduce manufacturing costs while maintaining the structural integrity of the brake band 10. The band 12, first bracket 14 and second bracket 16 are all stamped from sheet metal into their general configuration. Thereafter, the projections 36, 48 are extruded into the respective brackets 14, 16 and the apertures 34, 46 are formed in the straps. The ends 26 of the band 12 are joined using a butt weld to form the substantially circular brake band 10. The brackets 14, 16 are initially mounted to their respective straps 22, 20 by inserting the projections 36, 48 into the apertures 34, 46. Thereafter, compression pressure between the bracket and strap is applied to deformably insert the projections as the bracket is welded to the strap. Finally, the strap segments 32 are removed thereby freeing the first ends 28 of the outer straps 22. With the friction lining 17 applied to the inner surface of the band 12 the double wrap brake band 10 is now ready for installation into the transmission. Thus, the componentized make up of the brake band 10 reduces the complexity and cost of manufacture while the cooperation of the projections with their respective apertures increases the structural integrity of the brake band 10.

In manufacturing the double wrap brake band 10 it is important to maintain the configuration of the band since an out-of-round brake band 10 will not provide accurate cooperation with the clutch drum. In a preferred method of maintaining the configuration of the brake band 10, the formed band 12 is first heated through induction heating and thereafter placed upon a collapsible mandrel. Both the band 12 and the mandrel are immersed in a quench medium which causes the band 12 to shrink around the collapsible mandrel. Once cooled, the mandrel is collapsed allowing removal of the round brake band 10. In an alternate embodiment, the heated band 12 is placed on an expandable mandrel. Upon expansion of the mandrel, the band 12 will yield to the shape of the mandrel. Again, the mandrel and band 12 are quenched to cool the band 12 and set its shape. As a result, the double wrap brake band 10 is formed into the required circular configuration for optimum cooperation with the clutch drum of the transmission.

The foregoing detailed description has been given for clearness of understanding only and no unnecessary limitations should be understood therefrom as some modifications will be obvious to those skilled in the art without departing form the scope and spirit of the appended claims.

What is claimed is:

1. A double wrap brake band for a vehicle transmission, said brake band comprising:
a plurality of substantially parallel straps, each of said straps having a first free end, and said plurality of straps including a pair of spaced straps joined to each other by a band portion, wherein said pair of straps and said band portion are one piece, and at least one intermediate strap, said free ends of said pair of straps connected to a first bracket spanning said at least one intermediate strap, said free end of said at least one intermediate strap having a second bracket mounted thereto.

2. The brake band as defined in claim 1 wherein said spaced straps and said at least one intermediate strap is connected to form a substantially circular brake band, a second end of said spaced straps joined to a second end of said at least one intermediate step.

3. The brake band as defined in claim 1 wherein said first bracket includes at least one projection corresponding to each said spaced strap, said projections of said first bracket frictionally engaging corresponding apertures in said first free ends of said spaced straps to secure said first bracket to said spaced straps.

4. The brake band as defined in claim 3 wherein said first bracket is spaced apart from said at last one intermediate strap.

5. The brake band as defined in claim 3 wherein said second bracket includes at least one projection, said at least one projection of said second bracket frictionally engaging corresponding apertures in said first free end of said at least one intermediate strap to secure said second bracket to said at least one intermediate strap.

6. The brake band as defined in claim 5 wherein said first bracket and said second bracket are further secured to said corresponding straps by at least one weld.

7. The brake band as defined in claim 5 wherein said brake band comprises three substantially parallel straps including said pair of outer straps and an intermediate strap, said intermediate strap having said second bracket secured to said first free end thereof.

8. The brake band as defined in claim 7 wherein said first bracket includes at least one aperture for receiving first actuating means of the transmission.

9. The brake band as defined in claim 7 wherein said second bracket includes an abutment ridge for receiving second actuating means of the transmission.

10. The brake band as defined in claim 7 wherein an inner surface of said straps includes a frictional lining.

11. A double wrap brake band for a vehicle transmission, said brake band comprising:
three substantially parallel straps including a pair of outermost straps and intermediate strap, said straps having a first free end and a second end, said second end of outermost straps directly joined to said second end of said intermediate strap to form a substantially circular brake band;
a first bracket connected to said first free ends of said outermost straps, said first bracket spanning said intermediate strap in spaced apart relation; and
a second bracket connected to said first free end of said intermediate strap.

12. The brake band as defined in claim 11 wherein said first bracket includes at least one projection corresponding to each of said outermost straps, said at least one projection frictionally received within apertures formed in said first free ends of said outermost straps.

13. The brake band as defined in claim 12 wherein said first bracket and said second bracket are further secured to said corresponding apertures formed in said first free end of said intermediate strap.

14. The brake band as defined in claim 13 wherein said first bracket and said second bracket are further secured to said corresponding straps by at least one weld.

15. A method of making a double wrap band for an automotive transmission comprising the steps of:
stamping an elongated band having three substantially parallel straps, an intermediate strap having a first free end and a second end connected to a pair of outermost straps by removable strap segments;
directly joining the ends of said elongated band;
securing a first bracket to first ends of said outermost straps, said first bracket spanning said intermediate strap in spaced apart relation thereto;
securing a second bracket to aid first free end of said intermediate strap; and
removing said removable strap segments from said band thereby disconnecting said first ends of said outermost straps from said intermediate strap, said second end of said intermediate strap joined to a second end of said outermost straps.

16. The method as defined in claim 15 comprising the step of joining said first bracket to said first free ends of said outermost straps using a plurality of projections on said first bracket frictionally engaging corresponding apertures formed in said first free ends of said outermost straps.

17. The method as defined in claim 16 comprising the step of extruding said projections on the underside of said first bracket, said projections formed on outer legs of said first bracket.

18. The method as defined in claim 16 comprising the step of joining said second bracket to said first free end of said intermediate strap using at least one projection frictionally engaging corresponding apertures formed in said first free end of said intermediate strap.

19. The method as defined in claim 18 comprising the step of extruding said at least one projection on the underside of said second bracket.

20. The method as defined in claim 15 comprising the step of applying a frictional lining to the inner surface of said elongated band.

21. The method as defined in claim 15 and further comprising the steps of:
heating said elongated band after joining the ends of said elongated band;
positioning said heated band on a mandrel, said heated band assuming the configuration of said mandrel;
cooling said heated band thereby setting the configuration of said joined band in conformity with said mandrel.

22. The method as defined in claim 21 comprising the step of cooling said heated band by immersing said band and said mandrel into a quenching fluid.

23. The method as defined in claim 21 wherein said band is heated and formed prior to the step of removing said removable strap segments.

24. The invention as disclosed in claim 1 wherein at least one of said brackets include at least one projection registering with an aperture in a respective strap end.

25. The invention as disclosed in claim 24 wherein said projection includes a base initially larger than said aperture.

26. The invention as disclosed in claim 15 and further comprising forming at least one projection on at least one of said first and said second brackets and forming an aperture in said band to register with each said at last one projection.

27. The invention as disclosed in claim 26 wherein said forming step originally sizes said projection with a base larger than said aperture.

28. A double wrap brake band for a vehicle transmission, said brake band comprising:

a plurality of substantially parallel straps, said straps having a first free end and including a pair of spaced straps and at least one intermediate strap, said free ends of said spaced straps connected to a first bracket spanning said at least one intermediate strap, said free end of said at least one intermediate strap having a second bracket mounted thereto;

wherein at last one of said brackets and a respective strap end are joined by at least one projection on one of said bracket and said respective strap end registering with an aperture in the other one of said bracket and said respective strap end; and wherein said projection includes a base initially larger than said aperture.

29. The invention as disclosed in claim 28 wherein said at least one bracket includes said at least one projection registering with an aperture in a respective strap end.

30. A double wrap brake band for a vehicle transmission, said brake band comprising:

a plurality of substantially parallel straps, said straps having a first free end and including a pair of spaced straps joined to each other by a band portion and at least one intermediate strap, said free ends of said pair of straps connected to a first bracket spanning said at least one intermediate strap, said free end of said at least one intermediate strap having a second bracket mounted thereto;

wherein at least one of said brackets include at least one projection registering with an aperture in a respective strap end; and said projection includes a base initially larger than said aperture.

* * * * *

UNITED STATES PATENT AND TRADEMARK OFFICE
CERTIFICATE OF CORRECTION

PATENT NO. : 5,083,642
DATED : January 28, 1992
INVENTOR(S) : Oscar Stefanutti, Omar P. Oszust, and Richard T. Popchock It is certified that error appears in the above-identified patent and that said Letters Patent is hereby corrected as shown below:

Column 5, line 26, "step" should read -- strap --.

Column 5, line 61, before "intermediate" insert -- an --.

Column 6, line 26, "aid" should read -- said --.

Signed and Sealed this

Twenty-second Day of June, 1993

Attest:

MICHAEL K. KIRK

*Attesting Officer*     *Acting Commissioner of Patents and Trademarks*